United States Patent [19]

Kurokawa et al.

[11] Patent Number: 4,978,552

[45] Date of Patent: Dec. 18, 1990

[54] STARCH CONTAINING

[75] Inventors: Toru Kurokawa, Fuchu; Hiroyuki Watanabe, Hachioji; Shoichi Tanaka, Shizuoka; Fumito Mitsui, Koganei, all of Japan

[73] Assignee: Kewpie Kabushiki Kaisha, Tokyo, Japan

[21] Appl. No.: 426,024

[22] Filed: Oct. 24, 1989

Related U.S. Application Data

[62] Division of Ser. No. 128,698, Dec. 1, 1987, Pat. No. 4,891,238.

Foreign Application Priority Data

Jun. 29, 1987 [JP] Japan ................................ 62-159634

[51] Int. Cl.$^5$ ..................... A21D 2/34; A23L 1/164; A23L 1/18
[52] U.S. Cl. .................................... 426/559; 426/625
[58] Field of Search ............... 426/559, 622, 625, 447, 426/448, 449, 560, 549

[56] References Cited

U.S. PATENT DOCUMENTS

| | | | |
|---|---|---|---|
| 3,499,766 | 3/1970 | Vollink et al. | 426/559 |
| 3,708,308 | 1/1973 | Bedenk et al. | 426/448 |
| 4,419,371 | 12/1983 | Suderman | 426/560 X |
| 4,568,550 | 2/1986 | Fulger et al. | 426/549 X |
| 4,609,557 | 9/1986 | Mao et al. | 426/549 |
| 4,609,558 | 9/1986 | Giacone et al. | 426/549 |

FOREIGN PATENT DOCUMENTS 2041717  9/1980  United Kingdom ............... 426/448

*Primary Examiner*—Arthur L. Corbin
*Attorney, Agent, or Firm*—Oblon, Spivak, McClelland, Maier & Neustadt

[57] ABSTRACT

Disclosed is a process, and the product thereof, for producing swollen foods, e.g. croutons, having a softer mouth feel than might be expected from those obtained by a conventional process, which process comprises heating and pressurizing through an extruder a powder comprising fine particles of porous structure, e.g. eggshell or bone powder, and a food material predominantly comprising a starchy material and/or a protein and thereafter releasing and causing the same to swell.

6 Claims, No Drawings

STARCH CONTAINING

This is a division of application Ser. No. 07/128,698, filed on Dec. 1, 1987, now U.S. Pat. No. 4,891,238.

BACKGROUND OF THE INVENTION

The present invention relates to a novel process for producing puffed, inflated, or swollen foods (hereinafter referred to as "swollen" food(s)) and to a specific article of swollen food.

Various attempts have so far been made to obtain swollen foods by heating and pressurizing starchy materials such as flour and cornstarch or proteinaceous materials such as soybean protein through an extruder and then swelling the same by sudden release of pressure.

While swollen foods can be produced by such conventional methods generally with high efficiency, the swollen foods obtained heretofore have generally been liable to have coarse swollen cells or foam bubbles formed by foaming although depending upon the compositions of the foods. When the swollen cells or foam bubbles are coarse, i.e., large, the cell membranes are generally thick so that the whole swollen food becomes hard, resulting in a hard mouth feel. Consequently, such swollen foods have had the problem, for example, of being unsuitable for infant foods such as baby foods.

Further, in one specific mode of the above method for producing swollen foods in which a food material predominantly comprising a starchy material such as flour is mainly used, the total water content in the starting materials fed to an extruder is maintained at about 40% and the extruder used has a die outlet with a square cross section, the swelling percentage of an extrudate at the die outlet is low since the water content is somewhat higher than in starting materials ordinarily used, so that an extrudate having a square cross section approaching that of the die can be obtained. This extrudate, for example, is then cut to an appropriate length, and water contained therein in excess is removed by drying, whereby it can be expected that crouton-like articles can be obtained as the end product.

Although, when sprinkled over hot soup, the swollen food thus prepared does not soften (or become "mushy") in a time period as short as about 10 to 30 seconds, it is not crispy and feels so hard in the mouth that it is far from being a crouton from the standpoint of textural feel in the mouth.

Conventional croutons prepared by dicing bread into cubes and drying the so diced bread, on the other hand, can be easily crushed when they are eaten directly but, when sprinkled over hot soup, soften in about 20 to 30 seconds and do not feel crispy, thus losing somewhat their pleasant mouth feel.

SUMMARY OF THE INVENTION

In view of the above described situation, the primary and basic object of the present invention is to provide a novel process for producing swollen foods by heating, pressurizing and then swelling through an extruder a food material predominantly comprising a starchy material or a protein, which process ensures the production of swollen foods having a softer mouth feel than might be expected from those obtained by a conventional process.

A second and subsidiary object of the invention is to provide a novel process for producing swollen foods by heating, pressurizing and then swelling through an extruder a food material predominantly comprising a starchy material, which process ensures the production of swollen foods which, when sprinkled over hot soup, do not soften in a time period as short as about 10 to 30 seconds, i.e., do not lose crispiness in a short time period, and yet can be easily crushed (with the teeth), i.e., do not remain too hard.

A third object of the invention is to provide novel swollen foods having the desirable properties of the swollen foods produced by the process described with reference to the second object.

As a result of extensive research efforts expended toward the above objects, we have arrived at the present invention.

Basically, the characteristic feature of the process of the present invention is to heat, pressurize and thereafter swell through an extruder a powder comprising fine particles of porous structure and a food material predominantly comprising a starchy material and/or a protein.

DETAILED DESCRIPTION OF THE INVENTION

The term "powder comprising fine particles of porous structure" as used herein refers to a powder in the form of fine particles containing numerous micropores, typical examples being powders obtained by pulverization of eggshells, animal bones and the like.

These powders comprise fine particles with a maximum particle size of preferably $100\mu$ or less, and more preferably $50\mu$ or less. Specific examples of such powders are those comprising particles with a maximum particle size of $20\mu$ or less or in the range of from about 2 to $6\mu$ for example, because the smaller the particle size, the less rough mouth feel will the end product have.

The phrase "food material predominantly comprising a starchy material" is intended herein to mean a food comprising, as the principal ingredient thereof, a starch component such as rice, wheat or corn and also to include starches obtained by extracting only starch components from cereals such as rice and wheat. Further, the phrase "food material predominantly comprising a protein" as used herein designates a food comprising, as the principal ingredient thereof, a protein component such as soybeans or soybean protein. While these food materials may be in any form, they are generally in granular or powder form.

In the practice of the process of the present invention, a powder comprising fine particles of porous structure and a food material predominantly comprising a starchy material and/or a protein as desired, and, if necessary, seasonings (e.g., sugar, salt and cheese), flavors or spices, colorants, edible oils and pure water in an appropriate amount should first be prepared as starting materials.

A suitable quantity of the powder comprising fine porous particles is about 1 to 20% of the total quantity of the starting materials, for example, in the case of eggshell powder, and similar quantities may apply to powders of other sources. The powder in an excessively small quantity is not sufficiently effective in imparting a soft mouth feel while an excess of the powder tends to give a product which is too soft and unpalatable. Generally, a quantity of about 1 to 10% is preferred.

The total water content in the starting materials fed to an extruder may be about 10 to 18%, at which the materials can be easily swollen, in the case where an increase in swelling percentage is generally intended in order to produce swollen foods having a soft mouth feel and is ordinarily below 25%. However, in order to also achieve the second object of this invention at the same time, water contents of about 25% or higher are required so that the end product, when used as a garnish for soup, will not turn mushy in a short time but can remain crispy. If the water content is lower than 25% of the total weight of the starting materials, they tend to be swollen excessively when they are extruded and swollen through an extruder, and the end product, when used as a garnish for soup, will turn mushy in the mouth in a short time (20 to 30 seconds). If the water content is excessive, for example, higher than 50%, the swollen product obtained by extrusion will have a hard texture presumably because the product cannot be easily made porous.

Even in the case where the total water content in the starting materials is 25% or higher, however, the end product, while remaining crispy, will become too hard as a whole and feel hard in the core unless pulverized eggshells or bones are added. In order to attain the second object of the present invention, the water content is preferably in the range of from 30 to 45%.

Next, the starting materials described above are fed simultaneously in a given quantity to an extruder through which they are heated and pressurized. The extruder used in the process of this invention may be of any type provided that it can heat and pressurize the starting materials: either of the uniaxial type or of the biaxial type. From the standpoint of easy passage of kneaded materials through the extruder, however, a biaxial extruder which can be applied to a wider range of water content (8 to 95%) is preferable to a uniaxial extruder (10 to 30%).

All of the starting materials may be fed to the extruder from a feeder provided at the starting or upstream end of the screw, or a part of the materials (e.g., water) may be fed from an intermediate part of the barrel covering the screw. Further, the starting materials may either be kneaded together before feeding or be fed at a rate sufficient to obtain a constant ratio of the respective starting materials without kneading.

The starting materials are heated by means both of the frictional heat generated during the passage of the starting materials through the barrel of the extruder and of a heater (100° to 200° C.) provided at the barrel.

The starting materials are pressurized as they are forced to pass through the extruder by the screw.

The food material predominantly comprising a starchy material such as cereals is cooked by heating to 100° C. or higher temperatures whereby the starch component thereof turns pasty ($\alpha$-starch). The heating temperature ordinarily is about 100° to 180° C., preferably about 105° to 150° C. By heating at a temperature in this range, the starch component turns sufficiently pasty while, on the other hand, the food material predominantly comprising a protein turns fluid so that the kneaded materials, when extruded through the extruder, are swollen under atmospheric pressure and made porous at the same time. Since the heating temperature is 100° to 180° C., the pressure within the extruder is maintained ordinarily at about 1 to 40 kg/cm$^2$ The time for the food materials to pass through the extruder depends on the temperature, pressure and other conditions but may generally be in the range of from about 15 seconds to about 6 minutes.

The starting materials are thus heated and pressurized through the extruder to convert the starchy material into $\alpha$-starch, or to convert the protein into a molten state by thermal denaturation, and further to uniformly disperse fine particles of porous structure in the food materials. The resulting molten starting materials are then forced out abruptly into the air from the die portion of the extruder to obtain a swollen product. The swollen product thus obtained is soft and susceptible to deformation while the temperature thereof is high but, upon cooling in the air for a while, can be solidified into a desired form such as a stick or a sheet according to the shape of the die of the extruder, and the resulting swollen product is generally provided as the end product.

In order to attain the second object of the present invention, however, a food material predominantly comprising a starchy material is principally used as a starting material, and the total water content in the starting materials is maintained at 25% or higher, whereupon the extrudate obtained by the above procedure is cut to an appropriate length and the so cut pieces of the extrudate are then heated and dried. Also in this case, the starting materials are extruded through the die portion of the extruder as set forth above. The shape of the cross section of the extrudate is determined by that of the die, but, when the total water content in the starting materials fed to the extruder or the kneaded starting materials is lower than 25%, especially about 5 to 15%, the materials are swollen to such a great extent at the outlet of the extruder (die portion) that the shape of the cross section of the extrudate is not dependent on that of the die but is substantially circular so as to minimize the cross-sectional area thereof, and further the surface of the extrudate is so uneven that the extrudate of a definite shape is difficult to obtain. The shape of the cross section of the die is suitably selected depending upon the desired shape of the extrudate cross section, for example, a square of sizes of 5 to 8 mm, a circle having a diameter of 5 to 6 mm or a heart shape.

The extrudate is then cut to a size, for example, of 5 to 20 mm in accordance with the desired form of the end product. While any appropriate cutting means may be employed, automatic or hand-operated knives are generally used.

Heat-drying methods are not particularly limited, and hot air-drying or frying is applicable in general. In a method of drying by hot air, for example, hot air at 80° to 90° C. is used, and heating is carried out for about 20 to 40 minutes. From the standpoint of flavoring the product obtained, heat-drying by frying is preferred. The frying conditions may vary slightly with the moisture content of the extrudate, but frying at a temperature of 150° to 190° C. for about 30 seconds to 5 minutes is generally suitable.

The starting materials heated and pressurized into a molten state in the extruder are extruded into the air through the die portion thereof, whereby the air and moisture contained in the molten starting materials expand explosively all at once to form a swollen product.

In accordance with the process of the present invention, fine particles of porous structure are uniformly dispersed in the molten starting materials, and it is presumed that these fine particles serve to lessen the sizes of the foam bubbles generated in the swollen product when the starting materials are swollen and also disperse the foam bubbles uniformly in the swollen product.

As is apparent from the results of Test Example 1 which will be set forth hereinlater, the cells or foam bubbles formed in the swollen food obtained by the process of the present invention are smaller than those formed according to the conventional process and are dispersed uniformly in the swollen food. For this reason, a swollen food having a dense surface and cross section can be obtained by the process of the present invention. Further, small cells result in thin cell membranes, whereby the whole swollen food can be made soft.

By applying the process of the present invention, it is therefore possible to facilitate the production of swollen foods for infants including baby foods for which a soft mouth feel is desired.

In the case where a food predominantly comprising a starchy material is used as the food material and eggshell powder or bone powder is used as the fine particulate powder of porous structure while the total water content in the starting materials, including the above mentioned food material, fed to the extruder is maintained at 25% or higher, and the extrudate is cut to an appropriate length, heated and dried in accordance with the process of the present invention, a swollen cereal food obtained as the end product is not too soft or too hard and feels adequately crispy when used in various ways, for example, as a garnish for soups. Furthermore, this food can be suitably crushed by chewing and does not feel hard in the core when used as a garnish for a vegetable salad and eaten with a dressing, and hence it can be used in a wider range of foods.

The swollen food which has achieved the third object of the present invention will be described in detail in Test Example 3 set forth hereinlater.

EXPERIMENTAL EXAMPLES

The present invention will now be described in more detail with reference to test examples and specific examples of practice wherein all percentages are "% by weight".

TEST EXAMPLE 1

Eggshell powder (maximum particle size: 20μ), cornstarch and pure water were prepared as starting materials, the quantity of the pure water used being 6% of all the starting materials, and the ratio of the eggshell powder to the cornstarch used being as shown in TABLE 1. Subsequently, all the starting materials of the respective compositions were heated, pressurized and swollen through an extruder under the following conditions to obtain 6 types of swollen food samples of different compositions of starting materials.

For each of the samples thus obtained, the apparent bulk density was measured, and the mouth feel of the sample was tested, while the color tone of the sample and the state of swollen cells were respectively observed. The results obtained are shown in TABLE 1. It is apparent from these results that the swollen food comprising eggshell powder had a softer mouth feel than that comprising no eggshell powder.

TABLE 1

|  | Sample | | | | | |
|---|---|---|---|---|---|---|
|  | 1 | 2 | 3 | 4 | 5 | 6 |
| Composition of starting material | | | | | | |
| Quantity of eggshell powder (%) | 0 | 2 | 5 | 10 | 20 | 40 |
| Quantity of cornstarch (%) | 94 | 92 | 89 | 84 | 74 | 54 |
| Properties of product (swollen food) | | | | | | |
| Apparent bulk density | 0.22 | 0.09 | 0.07 | 0.09 | 0.09 | 0.08 |
| Mouth feel | hard | soft | soft | soft | soft | soft but unpalatable |
| State of swollen cell | coarse (ca. 8–4 mm) & ununiform | fine (ca. 2–1 mm) & uniform | fine (ca. 1–0.5 mm) & uniform | fine (-) & uniform | fine (-) & uniform | microscopic (-) & uniform |
| Color tone | Pale yellow | White | White | White | White | Slightly gray |

Notes:
(1) The figures in the parentheses roughly show the range of the size of the cells, i.e., foam bubbles.

(2) Extruding conditions:

All of the starting materials were fed into a biaxial extruder (supplied by Toshiba Kikai K.K., Model "TEM-50B", screw rotational speed 150 rpm, barrel temperature 140° C.) simultaneously in a given quantity and pressurized at 20 to 30 kg/cm$^2$ under heating to convert the materials into a molten state.

Subsequently, the molten starting materials were discharged into the air from the die portion of the extruder to swell the same to obtain a swollen food. The swollen product thus obtained was left standing to cool for 5 minutes at room temperature. Thereafter, the mouth feel and other characteristics of the product were determined.

(3) Similarly, a swollen product was prepared by the above procedure from the starting materials comprising 1% of eggshell powder, 93% of cornstarch and 6% of pure water. The mouth feel and other characteristics of this product were rated substantially between those of Sample 1 and Sample 2.

(4) A similar test was conducted with a sample in which the cornstarch in the starting materials was replaced by soybean protein powder, and the effect of softening the mouth feel of the product due to the addition of eggshell powder was observed to be substantially similar to that in the case where cornstarch was used.

EXAMPLE 1

10 kg of eggshell pOwder (maximum particle size 20μ), 90 kg of cornstarch and 6 kg of pure water were fed into a biaxial extruder (supplied by Toshiba Kikai K.K., Model "TEM-50B", screw rotational speed 150 rpm, barrel temperature 140° C.) simultaneously in a given quantity and pressurized at 20 to 30 kg/cm$^2$ under heating to convert the materials into a molten state.

Subsequently, the molten starting materials were discharged into the air from the die portion of the extruder to swell the same. The swollen product thus obtained was left standing to cool for 5 minutes at room temperature, whereby 95 kg of a swollen food having dense surfaces and moreover a soft mouth feel was obtained.

EXAMPLE 2

6 kg of bovine bone powder (maximum particle size 50μ), 95 kg of flour (high-gluten flour), 1 kg of table salt, 2 kg of sugar, 0.1 kg of yeast extract and 6 kg of pure water were fed into a biaxial extruder (screw rotational speed 120 rpm, barrel temperature 140° C.) simultaneously in a given quantity and pressurized at 20 to 30 kg/cm² under heating to convert the materials into a molten state.

The resultant molten starting materials were discharged into the air from the die portion of the extruder to swell the same. The swollen product obtained was left standing to cool for 5 minutes at room temperature, whereby 92 kg of a snack confection having a dense cross section surface and a soft mouth feel was obtained.

EXAMPLE 3

A swollen product was produced as in Example 1 except that the cornstarch was replaced by soybean protein (powder), whereby a swollen food having dense surfaces and moreover a soft mouth feel was obtained.

TEST EXAMPLE 2

In all of the samples of the compositions shown in the following TABLE, the starting materials excluding water were fed into a biaxial extruder (screw rotational speed 280 rpm, barrel temperature 130° C., barrel internal pressure ca. 30 kg/cm²) from a feeder at a rate of 0.42 kg/min. while water was fed through an inlet provided at the barrel portion. The starting materials in entirety were kneaded and heated in the barrel, and discharged into the air through a die (of approximately 6×6 mm square cross section). For each sample, the kneaded materials were passed through the extruder for approximately 2 minutes.

Each of the extruded samples (in the form of a bar) was manually cut with a knife at intervals of 6 mm, and the so cut pieces were fried in oil at 170° C. to produce croutons.

The mouth feel of the croutons thus produced from each sample was examined, whereupon the results shown in TABLE 2 below were obtained.

As is apparent from the data in TABLE 2, the croutons obtained by the process of the present invention are excellent in crispiness and shape of the product as compared with those obtained by the control processes.

TABLE 2

| Conditions | Process of the invention | Control process I | Control process II |
|---|---|---|---|
| Composition of starting material | | | |
| Flour (moisture content: ca. 14%) | 68(%) | 70(%) | 91(%) |
| Eggshell powder (average particle size: 2–3μ) | 4 | 0 | 4 |
| Water | 28 | 30 | 5 |
| Total water content in starting materials | 38 | 40 | 18 |
| Heating-drying condition | | | |
| Frying temperature & time | 170° C. 2 min. | 170° C. 2 min. | 170° C. 1 min. 20 sec. |
| Moisture content in fried crouton | 2.0% | 2.2% | 1.5% |
| Properties of product | | | |
| Mouth feel of product sprinkled over hot soup as determined after 3 min. | Does not turn mushy and is adequately crisp | Does not turn mushy but feels hard in the core | Turns mushy |
| Mouth feel of product itself | Adequately crispy, easily crushed and yet soft to the core | Hard as a whole and in the core (so hard as to feel prickly in the mouth) | Easily crushed and yet soft to the core |
| Shape of product | Substantially dice-shaped | Substantially dice-shaped | Substantially cylindrical (with no angles characteristic of dice) |
| Apparent bulk density | 0.35 | 0.36 | 0.11 |
| Size of cell | ca. 0.5–0.1 mm | ca. 1–0.5 mm | ca. 1–0.5 mm |

TEST EXAMPLE 3

In all of the samples of the compositions shown in the following TABLE, the starting materials excluding water were fed into a biaxial extruder (screw rotational speed 280 rpm, barrel temperature 130° C., barrel internal pressure ca. 30 kg/cm²) from a feeder at a rate of 0.42 kg/min. while water was fed through an inlet provided at the barrel portion. The starting materials in entirety were kneaded and heated in the barrel, and discharged into the air through a die (of approximately 6×6 mm square cross section). For each sample, the kneaded materials were passed through the extruder for approximately 2 minutes.

Each of the extruded samples (in the form of a bar) was manually cut with a knife at intervals of 6 mm, and the so cut pieces were heated with hot air at 80° to 90° C. for 20 to 30 minutes so that the final moisture content of the product would be 2.0%, thereby to produce croutons.

The mouth feel of the croutons thus produced from each sample was examined. The results obtained are summarized in TABLE 3.

As is apparent from the data in TABLE 3, the product crouton (swollen cereal food) having an apparent bulk density of about 0.22 to 0.39 and a cell size of about 0.7 to 0.08 mm remains appropriately crispy when sprinkled onto a hot soup and yet is not too hard.

It will also be evident that the crouton produced can retain the shape of the die relatively faithfully.

TABLE 3

| | Sample | | | | | | | |
|---|---|---|---|---|---|---|---|---|
| Conditions | 1 | 2 | 3 | 4 | 5 | 6 | 7 | 8 |
| Composition of starting material | | | | | | | | |
| Flour (moisture content: | 88.3(%) | 82.5(%) | 76.7(%) | 70.9(%) | 65.1(%) | 59.3(%) | 53.4(%) | Commerically |

TABLE 3-continued

| Conditions | Sample 1 | 2 | 3 | 4 | 5 | 6 | 7 | 8 |
|---|---|---|---|---|---|---|---|---|
| ca. 14%) | | | | | | | | available crouton (prepared from bread) |
| Eggshell (average particle size: 2–3μ) | 4 | 4 | 4 | 4 | 4 | 4 | 4 | |
| Water | 7.7 | 13.5 | 19.3 | 25.1 | 30.9 | 36.7 | 42.6 | |
| Total water content in starting materials | 20 | 25 | 30 | 35 | 40 | 45 | 50 | |
| Drying under heating | | | | | | | | |
| Hot air temperature and blowing time | 80–90° C. 20–30 min. | 80–90° C. 20–30 min. | 80–90° C. 20–30 min. | 80–90° C. 20–30 min. | 80–90° C. 20–30 min. | 80–90° C. 20–30 min. | 80–90° C. 20–30 min. | 80–90° C. 20–30 min. |
| Moisture content in dried crouton | 2.0% | 2.0% | 2.0% | 2.0% | 2.0% | 2.0% | 2.0% | 2.0% |
| Properties of product | | | | | | | | |
| Mouth feel of product sprinkled over hot soup as determined after 3 min. (mouth feel (1)) | X(1) | Δ(1) | O | O | O | O | Δ(2) | X |
| Mouth feel of product itself (mouth feel (2)) | O | O | O | O | O | O | Δ | O |
| Shape of product | X | Δ | O | O | O | O | O | O |
| Apparent bulk density | 0.10 | 0.16 | 0.22 | 0.28 | 0.34 | 0.39 | 0.45 | — |
| Size of cell | ca. 1–0.5 mm | ca. 0.9–0.4 mm | ca. 0.7–0.3 mm | ca. 0.6–0.2 mm | ca. 0.5–0.1 mm | ca. 0.3–0.08 mm | ca. 0.2–0.05 mm | ca. 1–0.5 mm |

Notes:
(1) The symbols O, Δ and X in the Table respectively indicate the following characteristics.
Mouth feel (1):
X(1) softens to turn mushy in 3 to 5 seconds
Δ(1) turns mushy in 0.5 to 1 minute
O remains moderately hard and feels crispy for about 3 minutes
Δ(2) remains moderately hard and feels crispy for about 3 minutes, but feels hard in the core (too hard)
Mouth feel (2):
O feels soft to the core (appropriately crushed)
Δ feels slightly hard in the core (not easily crushed)
Shape of product:
X substantially cylindrical (with no angles characteristic of dice)
Δ while having angles, each edge expanding outwardly in an arch form (swollen)
O substantially dice-shaped
(2) The sizes of the cells in the extrudate were measured with respect to those visible in a cross section perpendicular to the direction of extrusion. Few cells were found on the outer sides of the extrudate in the direction of extrusion.

EXAMPLE 4

Croutons were produced in accordance with the process of the present invention described in Test Example 2 above except that the starting materials were used in the following proportions.

| Starting material | Proportion (%) |
|---|---|
| Flour (moisture cont.: ca. 14%) | 64 |
| Eggshell powder (av. particle size: 6μ) | 4 |
| Soybean protein powder (moisture cont.: ca. 6%) | 4 |
| Water | 28 |
| | 100 |

The water content in the overall starting materials was approximately 37%, and the moisture in fried croutons was approximately 1.8%.

EXAMPLE 5

Croutons were produced in accordance with the process of the present invention described in Test Example 2 above except that the starting materials were used in the following proportions.

| Starting material | Proportion (%) |
|---|---|
| Flour (moisture cont.: ca. 14%) | 65 |
| Bone powder (av. particle size: 6μ) | 4 |
| Shortening | 1 |
| Sugar | 2 |
| Water | 28 |
| | 100 |

The water content in the overall starting materials was approximately 37%, and the moisture in fried croutons was approximately 1.8%.

EXAMPLE 6

Croutons were produced as in the process of the present invention described in Test Example 2 above except that the starting materials were used in the following proportions and that the following extruding conditions were employed.

| A: Starting material | Proportion (%) |
|---|---|
| Flour (moisture cont.: ca. 14%) | 64 |
| Eggshell powder (av. particle size: 10μ) | 3 |
| Water | 33 |
| | 100 |

The water content in the overall starting materials was approximately 42%, and the moisture in fried croutons was approximately 1.7%.

| B: Extruding conditions | |
|---|---|
| Screw rotational speed | 250 rpm |
| Barrel temperature | 120° C. |
| Barrel internal pressure | ca. 35 kg/cm² |

-continued

| B: Extruding conditions | |
|---|---|
| Starting material feeding rate | 0.60 kg/min. |

EXAMPLE 7

Croutons were produced as in the process of the present invention as described in Test Example 2 except that the extrudate cut at intervals of 6 mm was heat-dried with hot air instead of frying (temperature: 90° C., time: 20 minutes). The moisture content in the end product obtained was approximately 3.5%.

None of the croutons obtained in Examples 4 through 7 described hereinbefore turned mushy in the mouth, but they remained crispy even 1 to 2 minutes after they were sprinkled onto a hot soup as a garnish.

We claim:

1. A swollen food predominantly comprising a starchy food material as the principal ingredient thereof and fine particles of porous structure having a particle size of 100 microns or less, said swollen food having an apparent bulk density of approximately 0.22 to 0.39 and a major proportion of cells or bubbles formed therein having a size in the range of from about 0.7 to 0.08 mm.

2. The swollen food according to claim 1, in the form of a crouton.

3. The swollen food according to claim 1, wherein said fine particles are eggshell powder or bone powder.

4. The swollen food according to claim 1, wherein said fine particles are of eggshell powder.

5. The swollen food according to claim 1, wherein said fine particles are of bone powder.

6. The swollen food according to any of claims 1 and 3-5, wherein said fine particles are present in an mount of 1-20 wt. %.

* * * * *

UNITED STATES PATENT AND TRADEMARK OFFICE
CERTIFICATE OF CORRECTION

PATENT NO. : 4,978,552

DATED : December 18, 1990

INVENTOR(S) : Kurokawa, Toru

It is certified that error appears in the above-identified patent and that said Letters Patent is hereby corrected as shown below:

Title page, item (54):

The title reads,--"STARCH CONTAINING", should read as follows,

--STARCH CONTAINING SWOLLEN FOODS--

Signed and Sealed this

First Day of September, 1992

Attest:

DOUGLAS B. COMER

Attesting Officer

Acting Commissioner of Patents and Trademarks